United States Patent
Westerweck et al.

(10) Patent No.: US 6,805,499 B2
(45) Date of Patent: Oct. 19, 2004

(54) IMAGE CAPTURE DEVICE DOOR MECHANISM

(75) Inventors: Lothar Westerweck, Hollywood, FL (US); Wilfred Bittner, Tsing Yi (HK)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 10/669,061

(22) Filed: Sep. 23, 2003

(65) Prior Publication Data

US 2004/0081449 A1 Apr. 29, 2004

Related U.S. Application Data

(60) Provisional application No. 60/413,079, filed on Sep. 23, 2002, and provisional application No. 60/450,304, filed on Feb. 27, 2003.

(51) Int. Cl.⁷ .................................................. G03B 17/00
(52) U.S. Cl. ...................................... 396/448; 396/543
(58) Field of Search ............................... 348/373–376; 396/448, 543

(56) References Cited

U.S. PATENT DOCUMENTS

| | | | | | |
|---|---|---|---|---|---|
| 5,913,089 | A | * | 6/1999 | Ebe | 396/448 |
| 6,088,531 | A | * | 7/2000 | Endoh | 396/29 |
| 6,212,335 | B1 | * | 4/2001 | Inazuka | 396/85 |
| 6,377,756 | B1 | * | 4/2002 | Aoki | 396/543 |
| 6,628,901 | B2 | * | 9/2003 | Naka | 396/301 |
| 2002/0039493 | A1 | * | 4/2002 | Tanaka | 396/543 |

* cited by examiner

Primary Examiner—David M. Gray
(74) Attorney, Agent, or Firm—Scott L. Lampert; Kerry Sisselman

(57) ABSTRACT

A door opening mechanism for an image capture device is provided which translates non-linear motion into a linear motion used to open or close the lens door. In one particular embodiment, rotary motion is translated to the linear up and down motion of the lens door. In another embodiment, the pendular motion of a door control grip is translated to the linear up and down motion of the lens door.

27 Claims, 19 Drawing Sheets

IMAGE CAPTURE DEVICE DOOR MECHANISM

PRIORITY

The present application claims priority from co-pending provisional patent application Ser. No. 60/413,079, Filed on Sep. 23, 2002, entitled IMAGE CAPTURE DEVICE and co-pending provisional patent application Ser. No. 60/450,304, Filed on Feb. 27, 2003, entitled IMAGE CAPTURE DEVICE DOOR MECHANISM.

FIELD OF THE INVENTION

The present invention relates to image capture devices and more particularly, to a lens door mechanism for an image capture device.

BACKGROUND OF THE INVENTION

There is an interest in making cameras more compact. In order to do so, certain parts on the camera can be designed to take up less space.

What is needed is to an image capture device that has been designed to be compact. What is further needed are image capture device components that require less space in or on the image capture device to work.

SUMMARY OF THE INVENTION

A door opening mechanism for an image capture device is provided which translates non-linear motion into a linear motion used to open or close the lens door.

In one particular embodiment, rotary motion is translated to the linear up and down motion of the lens door.

In another embodiment, the pendular motion of a door control grip is translated to the linear up and down motion of the lens door.

Other particular features and embodiments will become apparent from the following detailed disclosure of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood however, that the invention is not limited to the specific methods and instrumentality's disclosed. Additionally, like reference numerals represent like items throughout the drawings. In the drawings.

DETAILED DESCRIPTION OF THE PREFERRED EMBODIMENTS

Figure 1:
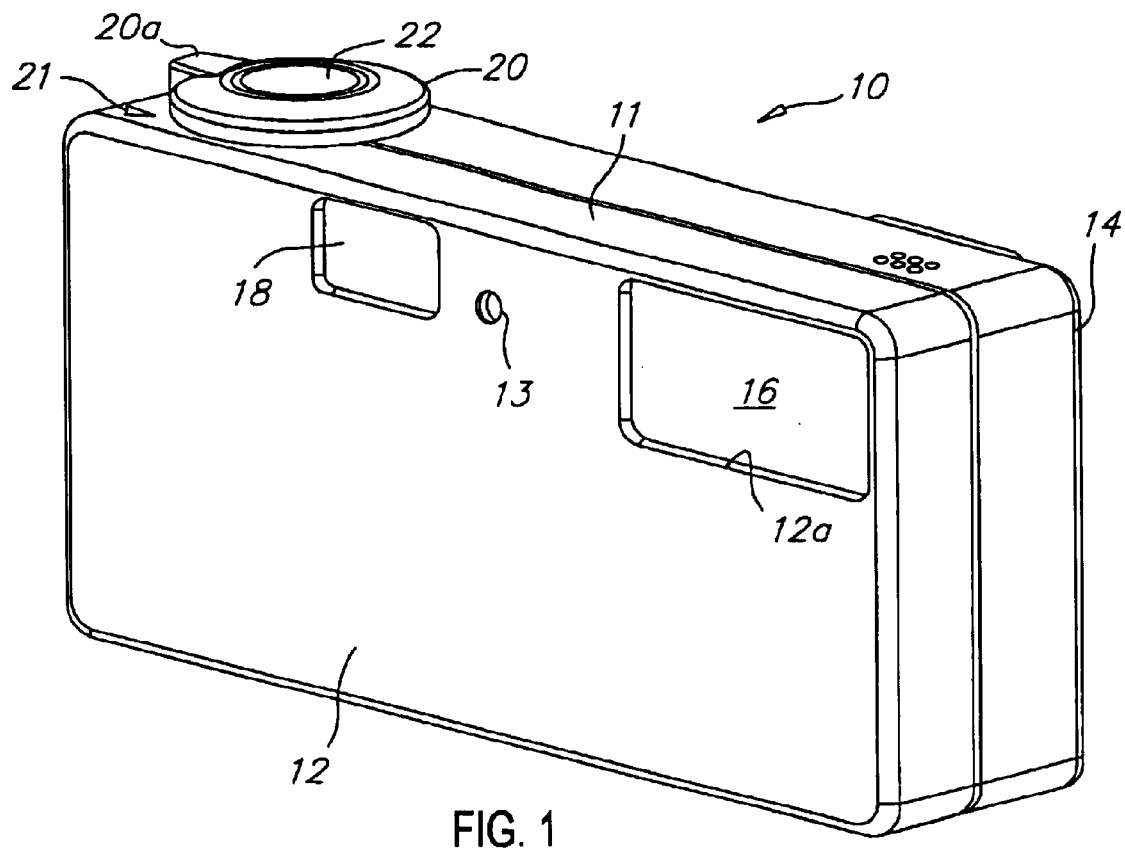
FIG. 1 is a perspective view of an image capture device in accordance with one embodiment of the present inventions.
Figure 2:
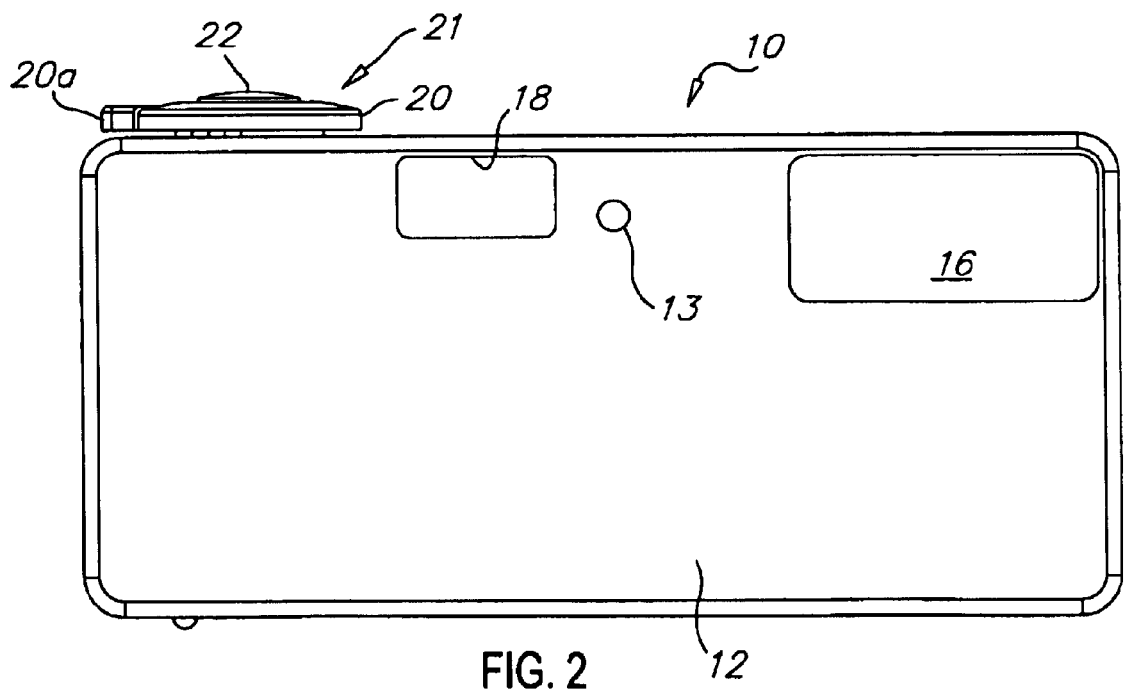
FIG. 2 is a front plan view of the image capture device of FIG. 1.

Before explaining the disclosed embodiments of the present invention in detail, it is to be understood that the invention is not limited in its application to the details of the particular arrangement shown since the invention is capable of other embodiments. Also, the terminology used herein is for the purpose of description and not of limitation.

The Image Capture Device Housing

Referring now to FIGS. 1–5, there is shown an image capture device 10 made in accordance with one particular embodiment of the present invention. Image capture device 10 includes a front housing 12 and a rear housing 14 that matingly engage to surround the internal workings of the image capture device 10. A compartment door 15 may engage either or both of the front and rear housings 12 and 14 to provide access to a battery compartment and/or to output connectors. Such output connectors may be used to connect the image capture device 10 to an external device such as a television, a computer a printer, a cell phone, etc.

Figure 3:
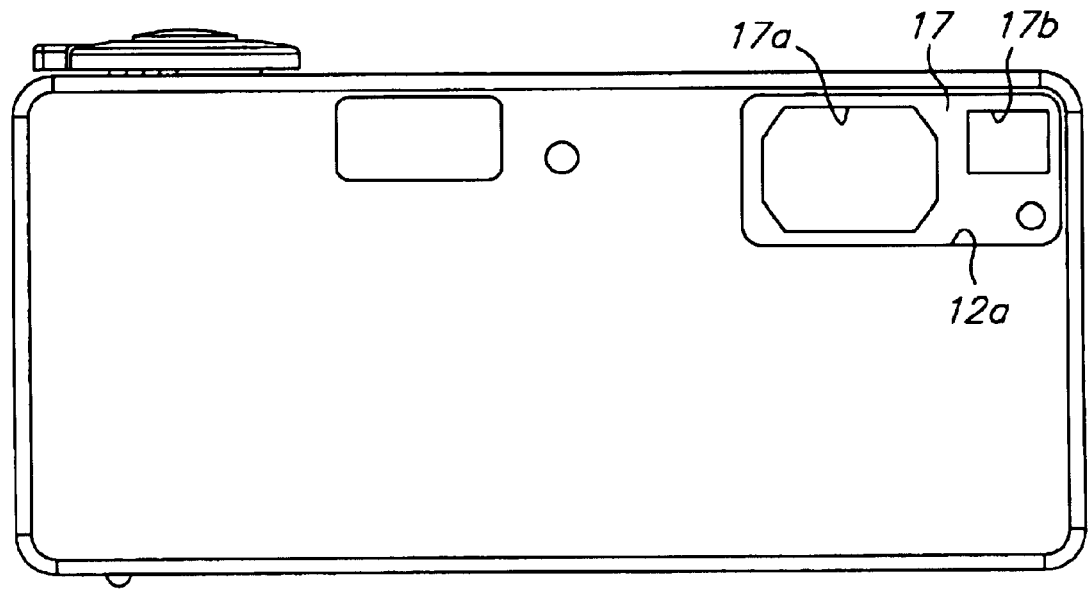
FIG. 3 is a front plan view of the image capture device of FIG. 1 wherein the lens cover has been opened to expose the lens and viewfinder front apertures.
Figure 4:
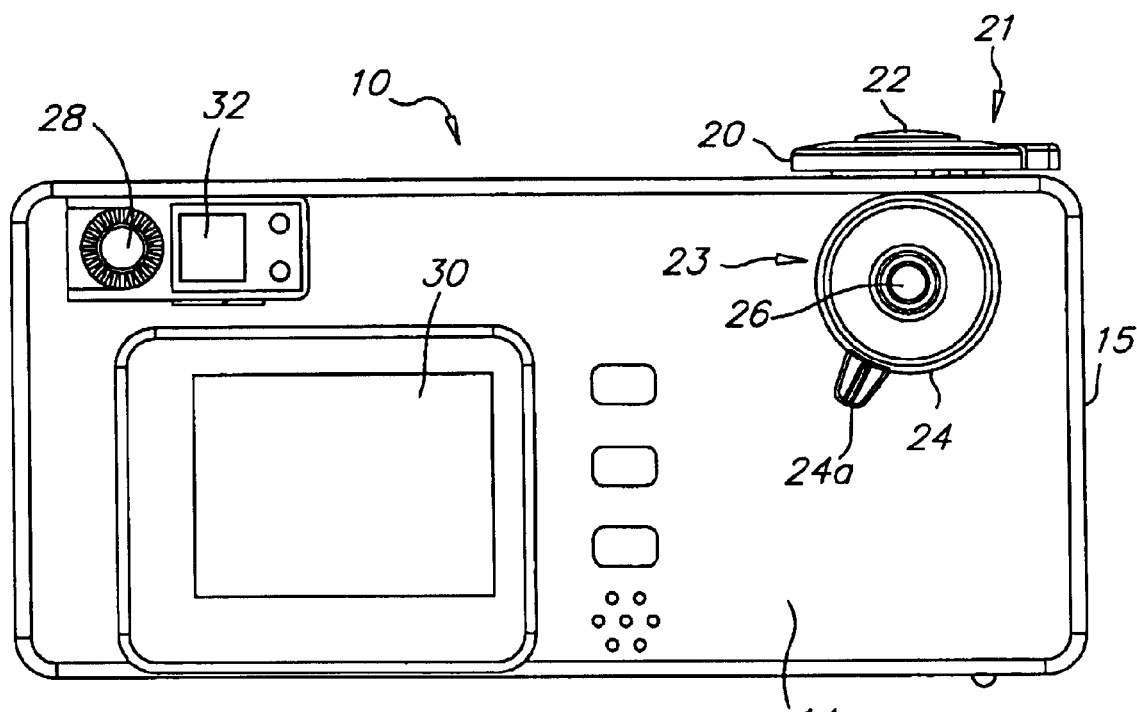
FIG. 4 is a rear plan view of an image capture device in accordance with one particular embodiment of the present inventions.

Front housing 12 of image capture device 10 includes a plurality of apertures formed therethrough, such as a taking lens/viewfinder window 12a, an aperture 13 for a red eye reduction mechanism and a flash window 18. As shown in FIG. 3, when the lens door 16 is opened, the taking lens aperture 17a and viewfinder aperture 17b of the lens mask 17 are exposed.

Rear housing 14 additionally includes a plurality of apertures therethrough. For example, the rear housing 14 of the present particular embodiment includes openings a rotary switch 24, nested tactile switch 26, a rotary diopter adjustment knob 28, an LCD display 30 a view finder rear aperture 32 and signal indicators 34. Other user interface devices, buttons and switches may be included.

A battery door 15 extends across an aperture through a side face of the image capture device 15.

Rotary On/Off Switch With Nested Release Button

Figure 5:
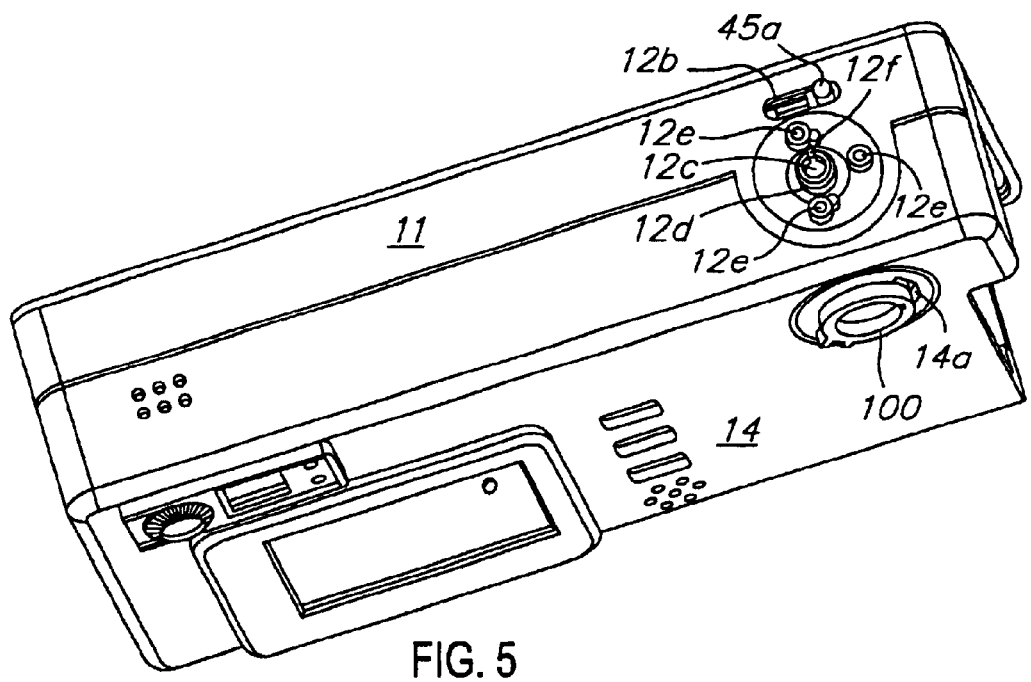
FIG. 5 is a top perspective view of an image capture device in accordance with one embodiment of the present invention having parts removed to more clearly see features of one embodiment.
Figure 6:
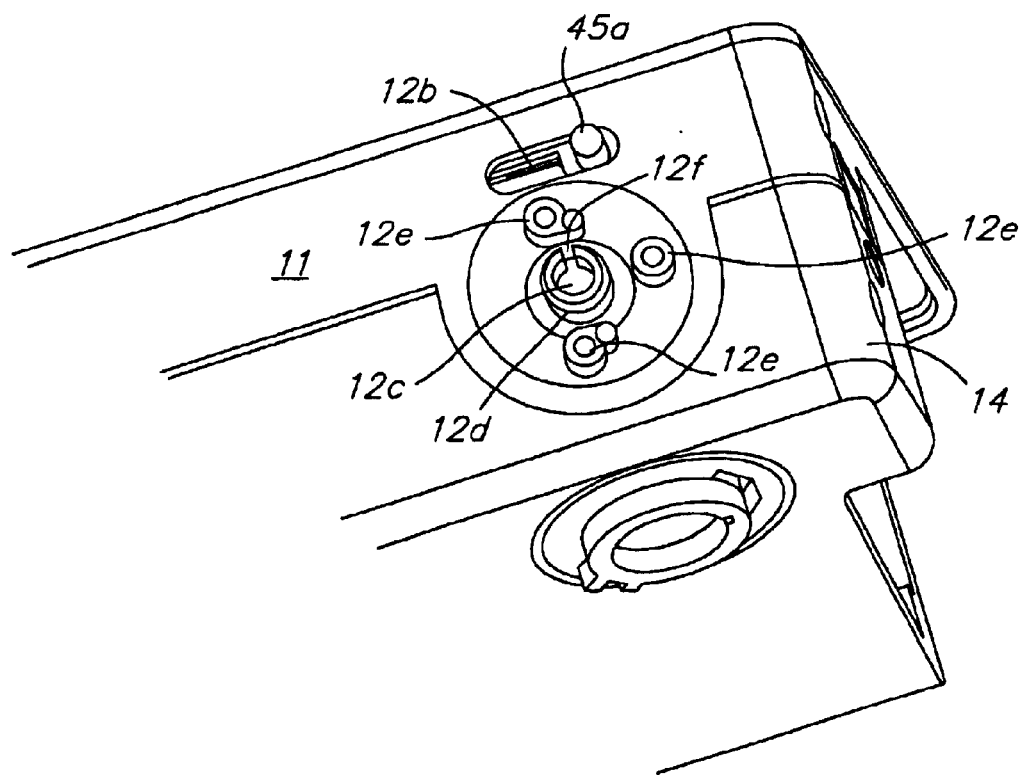
FIG. 6 is an enlarged view of a portion of FIG. 5.

Referring more specifically to FIGS. 5–6, front housing 12 additionally includes an aperture 12b and release shaft opening 12c. A cylindrical bearing shaft post 12d and three fastener posts 12e additionally extend from the upper surface 11 of the front housing 12. Bearing shaft post 12d includes a rectangular key opening 12f, therethrough. Door control pin 45a extends through the aperture 12b.

Figure 14:
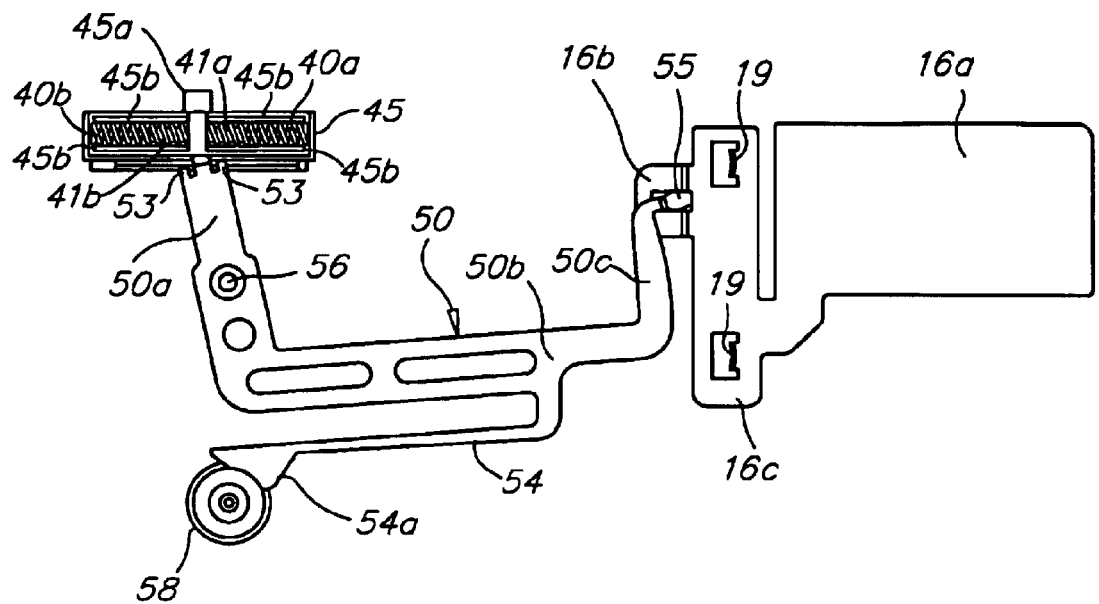
FIG. 14 is a side plan view of certain elements of a door opening mechanism, in accordance with one embodiment of the present invention.
Figure 15:
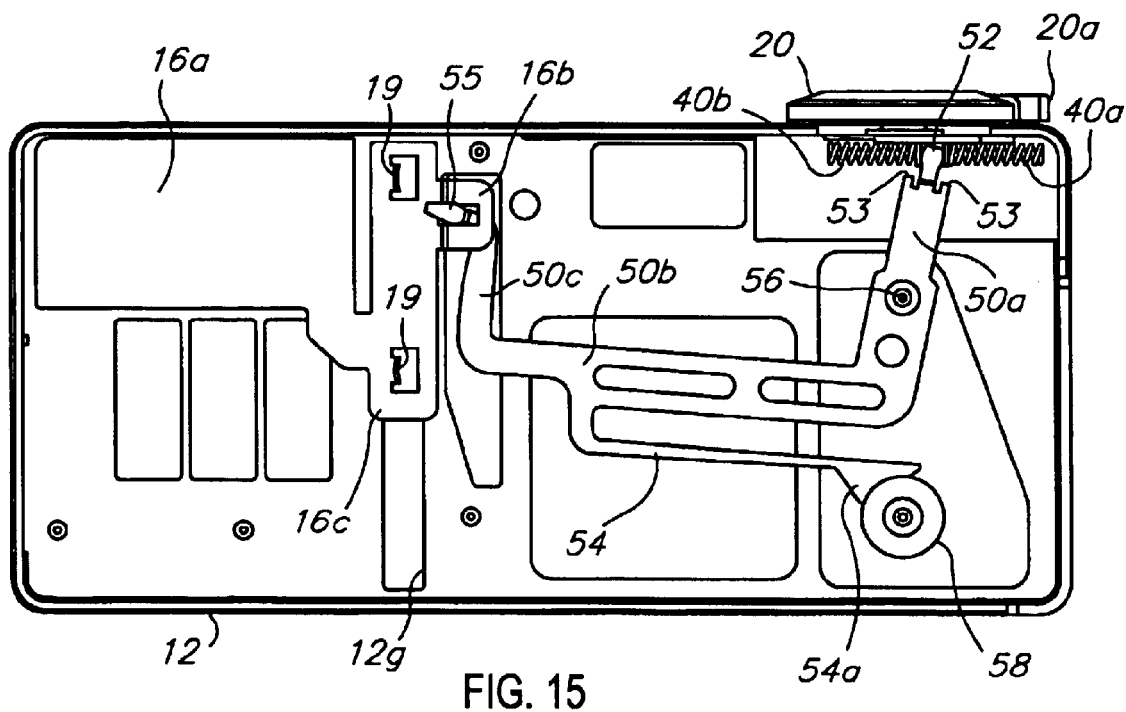
FIG. 15 is a side plan view of door opening mechanism in accordance with one particular embodiment of the present invention.
Figure 16:
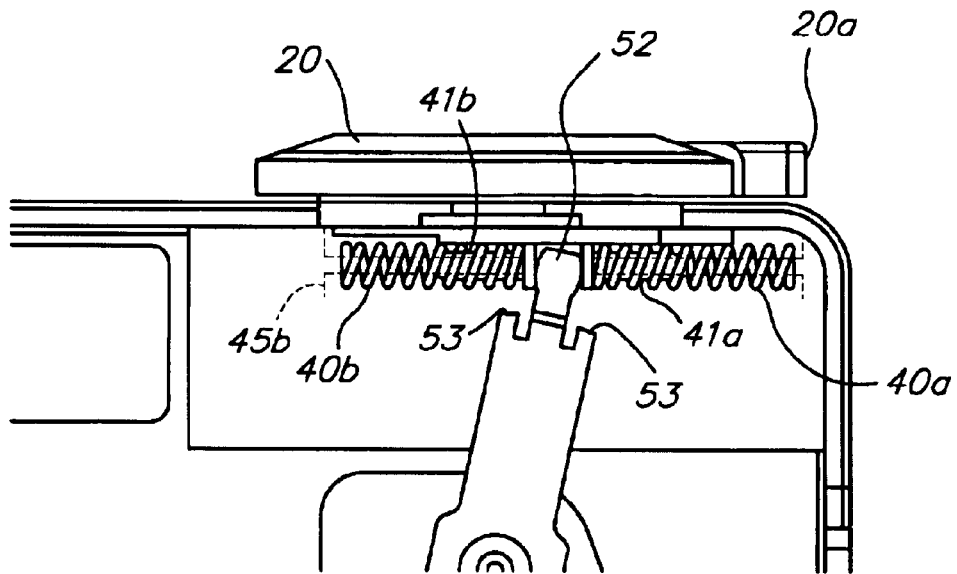
FIG. 16 is an enlarged view of a portion of the door opening mechanism of FIG. 15.
Figure 17:
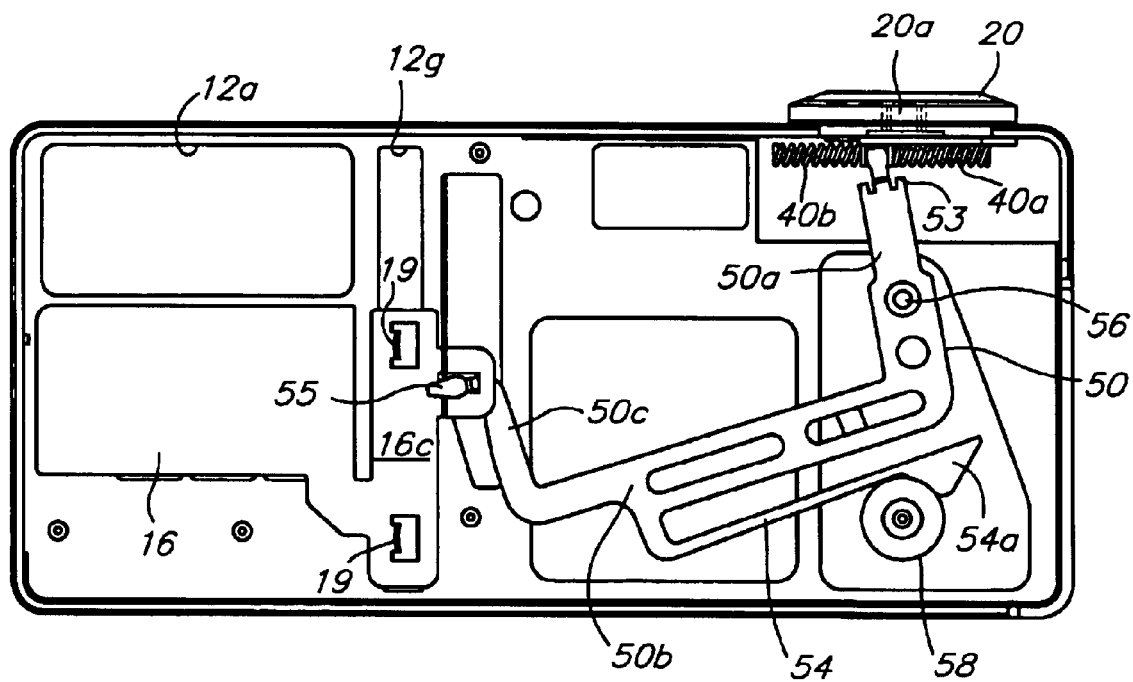
FIG. 17 is a side plan view of door opening mechanism in accordance with one particular embodiment of the present invention.

The nested switch assembly 21 is secured to the camera in a novel manner as will be described in connection with FIGS. 6–10. First, referring to FIG. 7, the rotary on/off switch gear 20 is located around the cylindrical bearing shaft post 12d on the top surface 11 of the front cover 12 and a hole 20b on the underside of the rotary on/off switch gear 20 is lockingly engaged with the door control pin 45a of a door connector (45 of FIG. 14). The fastener posts 12e pass through openings 20d in the rotary on/off switch 20. Openings 20d additionally include enough space to accommodate fastener posts 12e when the gear 20 is moved in the direction of arrow X, without permitting the gear 20 to be overdriven or turned in the wrong direction. Further, the rotary on/off switch gear 20 includes openings 20e and 20f spaced 35 degrees apart, which will engage an on/off detent mechanism, as will be described in connection with FIG. 8. Although the present particular embodiment shows the openings 20e and 20f as being 35 degrees apart, it can be seen that the system could be adapted to have the openings different distances or angles apart, and the detent spring 60 of FIG. 8, could be likewise adapted. The on/off detent positions of the switch 20 are accomplished using a detent spring finger that moves in and out of two slots of the lens door gear, as will be described more specifically in connection with FIGS. 7 and 8.

Figure 7:
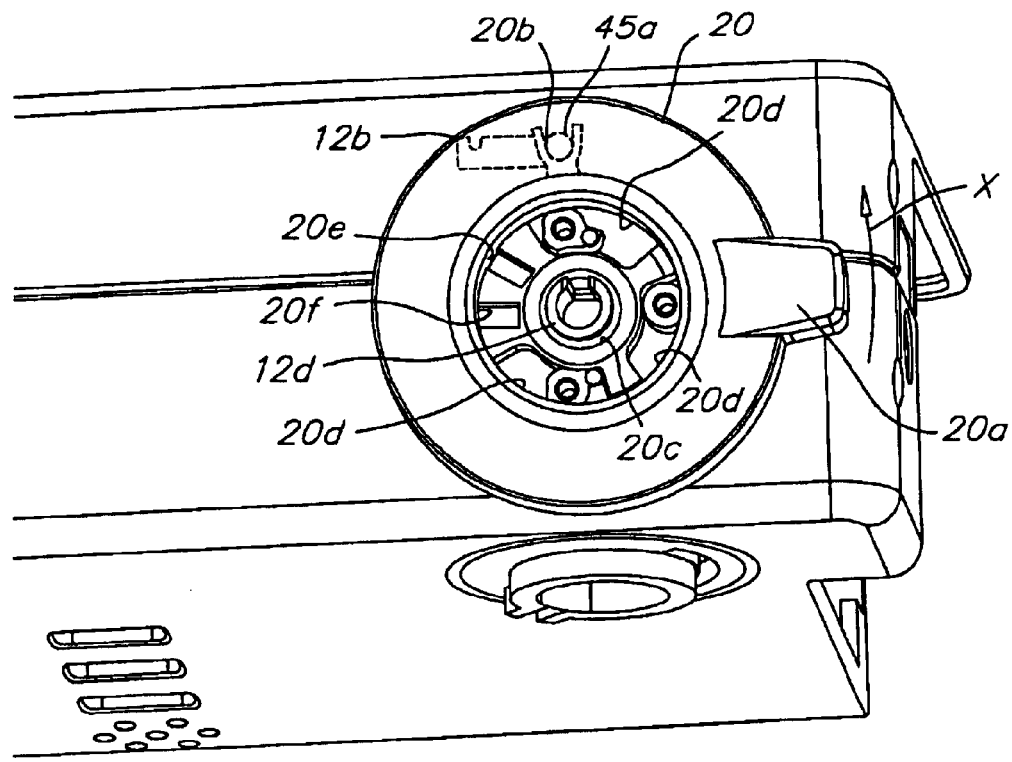
FIG. 7 is a top partial perspective view of an image capture device in accordance with one embodiment of the present inventions having parts removed to more clearly see features of one embodiment
Figure 8:
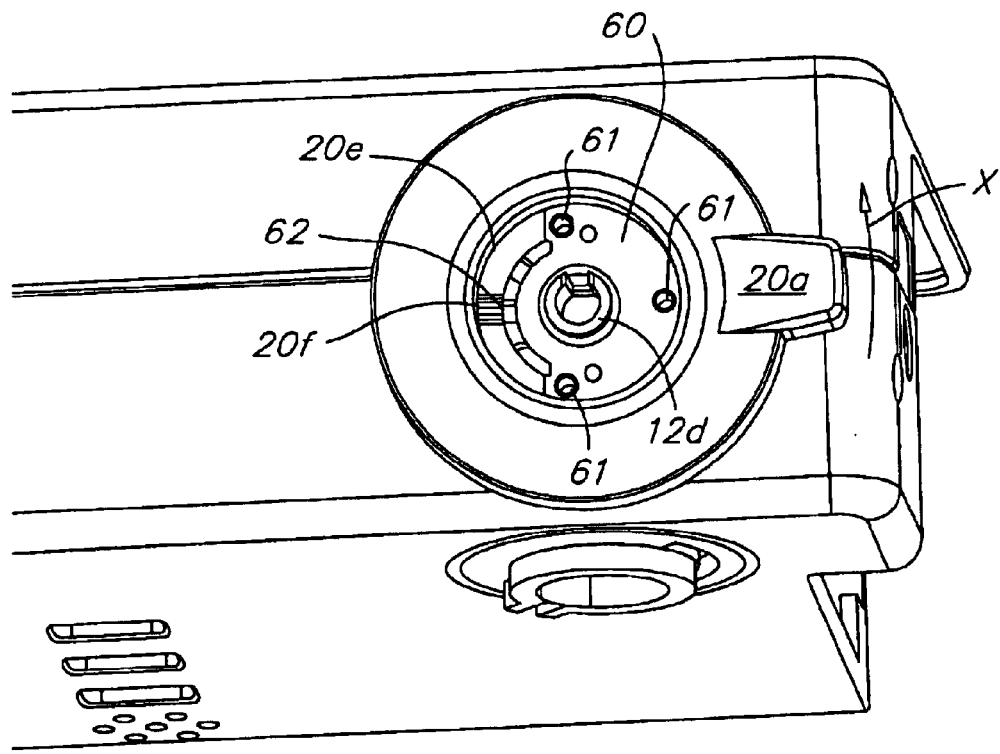
FIG. 8 is a top partial perspective view of the image capture device of FIG. 7 further including a detent spring.

Referring now to FIGS. 7 and 8, an on/off detent spring 60 sits on top of the inner circumference of the rotary on/off gear 20. On/off detent spring 60 has holes 61 that align with holes in the posts 12e (FIG. 6). Additionally, the on/off detent spring 60 includes a spring finger 62. When the rotary on/off switch gear 20 is in an initial position (i.e. the off position), the detent spring finger 62 rests in the opening 20f of the rotary on/off switch gear 20, capturing the switch gear 20 in the off position. When the rotary on/off switch gear 20 is turned in the direction of arrow X, the detent spring finger 62, which is maintained stationary due to screws (74 of FIG. 9) securing them to the top face 11 of the front housing 12. However, when the gear 20 is rotated into its second position (i.e. the on position), the gear 20 rotates about the bearing shaft post 12d in the direction of arrow X, and the detent spring finger 62 is captured by the gear 20 in opening 20e. Thus, the switch has two distinct detent positions. It can be seen how other additional switch positions may be added.

Further, as the gear knob 20a, and correspondingly the gear 20, is rotated, the door control pin 45a captured in the hole 20b is moved linearly along the slot 12b. Moving the door control pin 45a moves the door connector (45 of FIG. 14) correspondingly. When the door controller 45 is moved between a first and a second position, a conductive wiper (47 of FIG. 14) is also moved between a first and second position, providing a signal to the processor (not shown) that the rotary on/off switch 21 has moved from an "off" position to an "on" position or vice versa.

Figure 9:
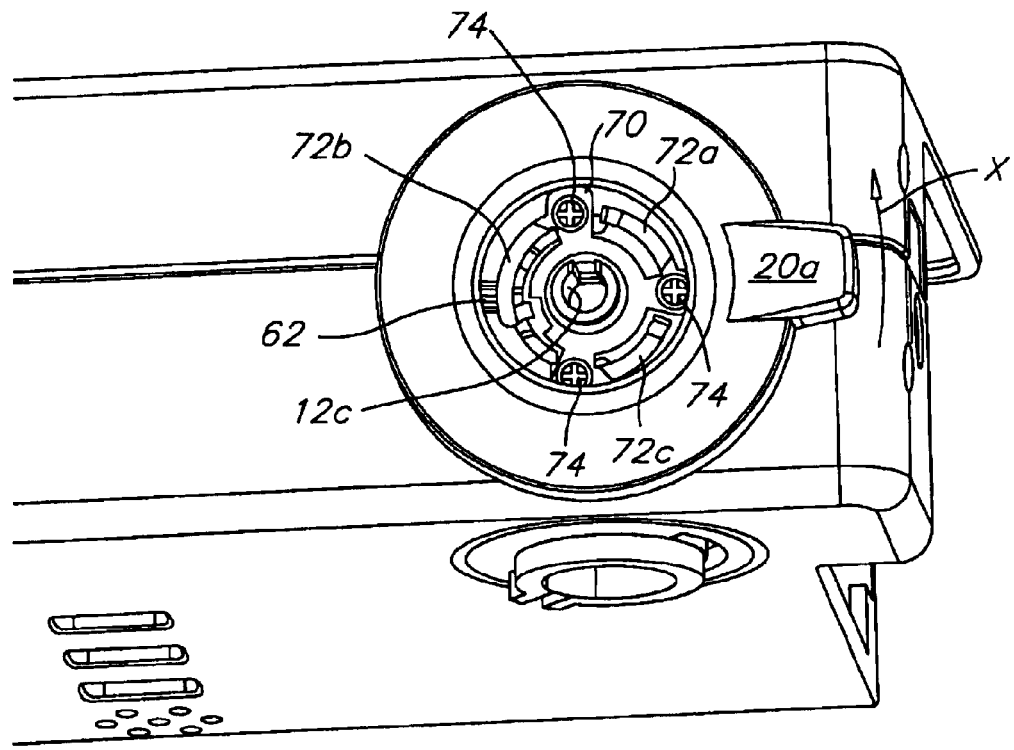
FIG. 9 is a top partial perspective view of the image capture device of FIG. 8, further including a release button spring.
Figure 10:
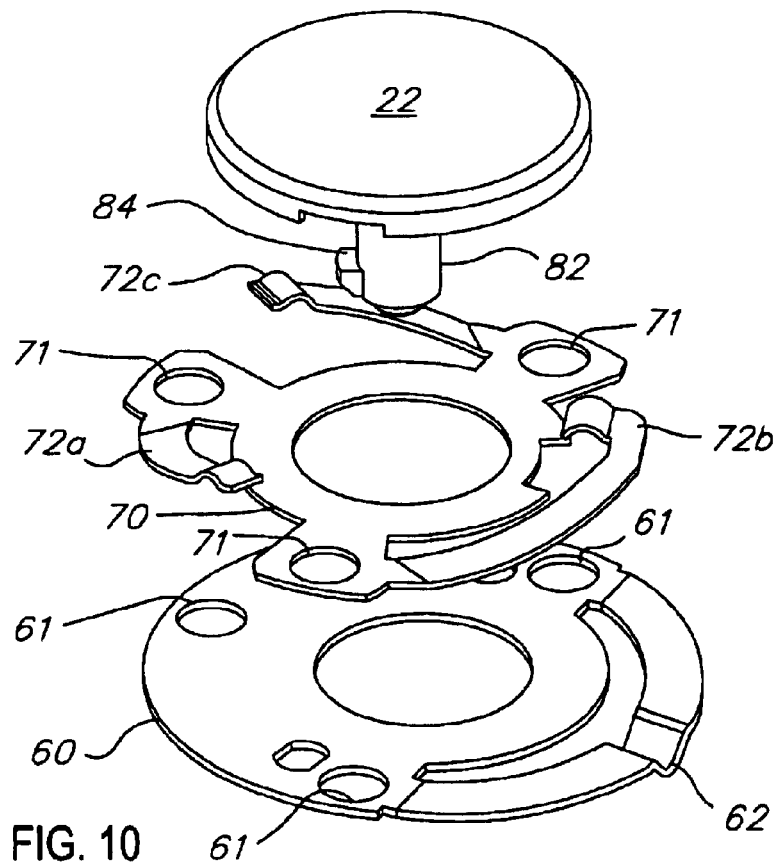
FIG. 10 is a perspective view of an image capture button aligned with a detent spring and a release button spring in accordance with one embodiment of the present invention.
Figure 11:
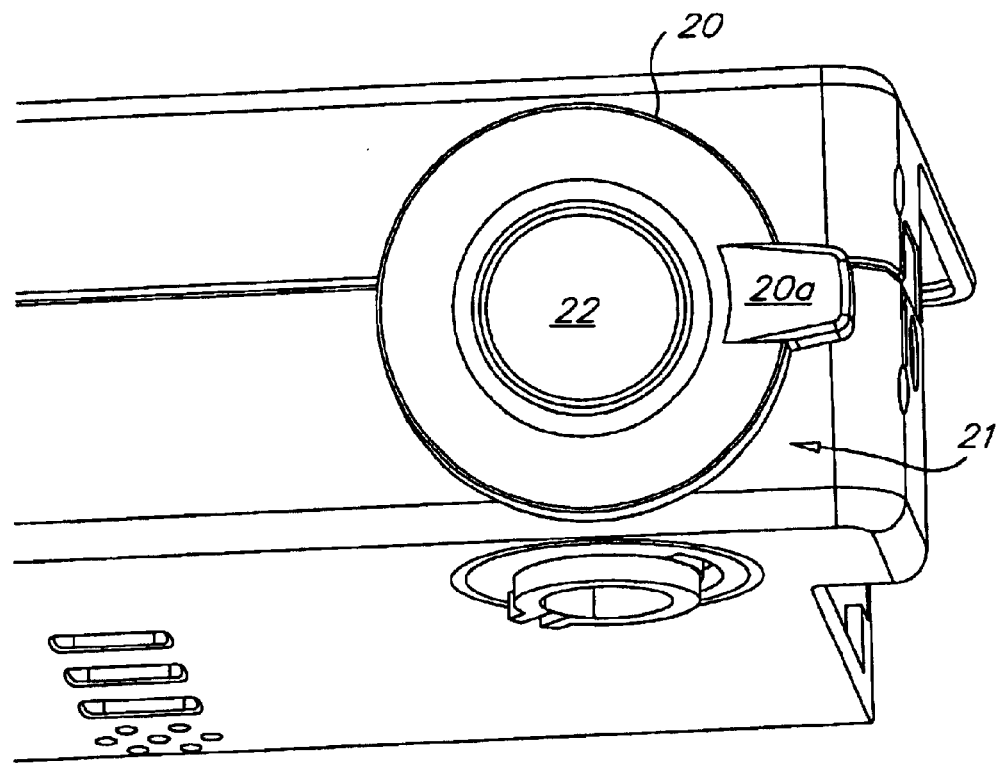
FIG. 11 is a top partial perspective view of the image capture device in accordance with one embodiment of the present invention.
Figure 12:
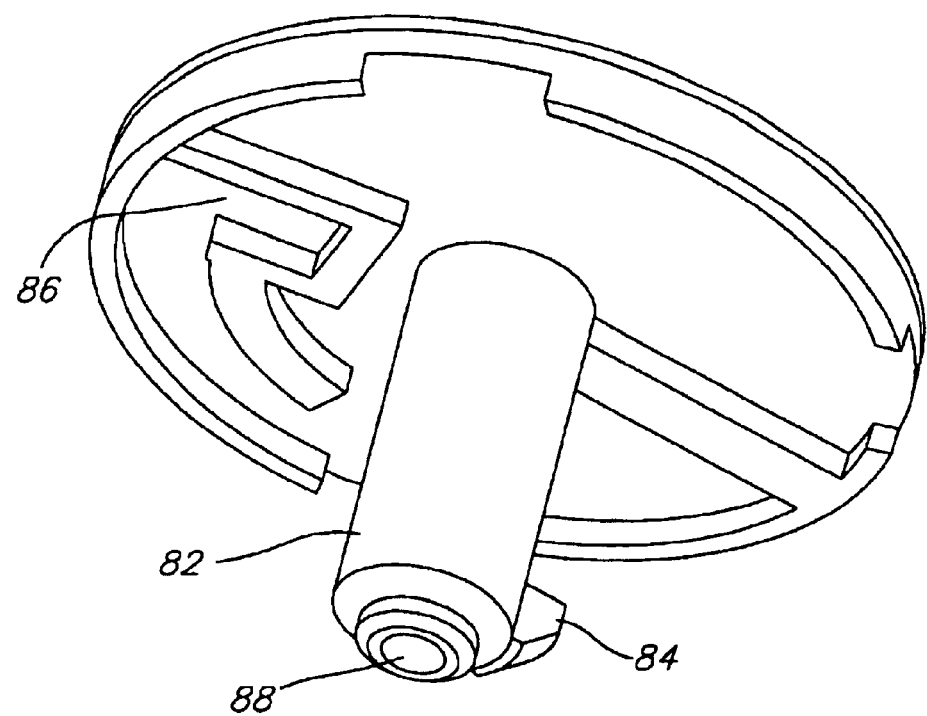
FIG. 12 is an isometric view of a release button in accordance with one embodiment of the present invention.
Figure 13A:
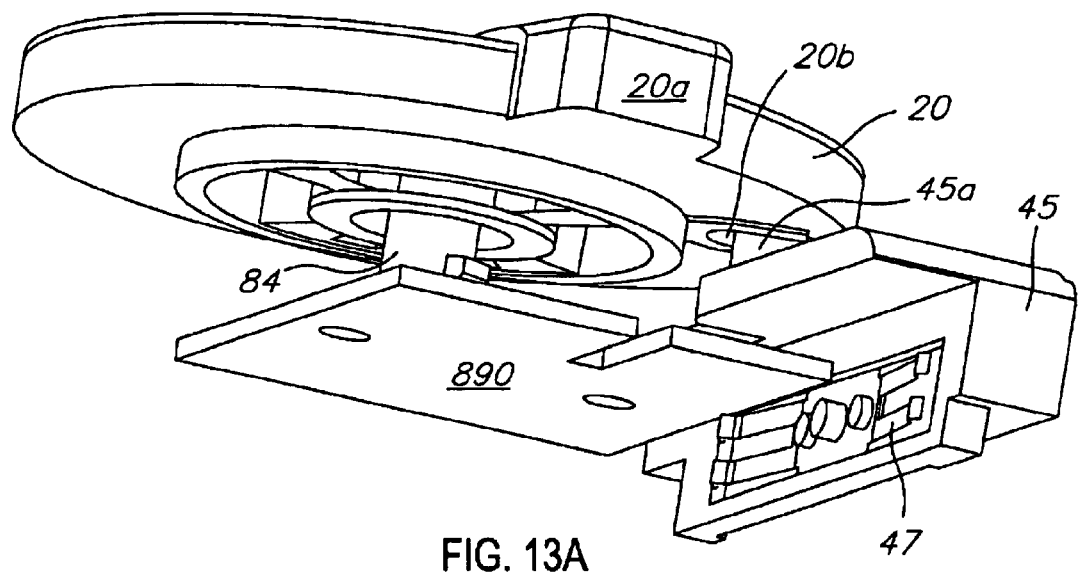
FIG. 13A is a perspective view of a portion of a door opening mechanism in accordance with one embodiment of the present invention.
Figure 13B:
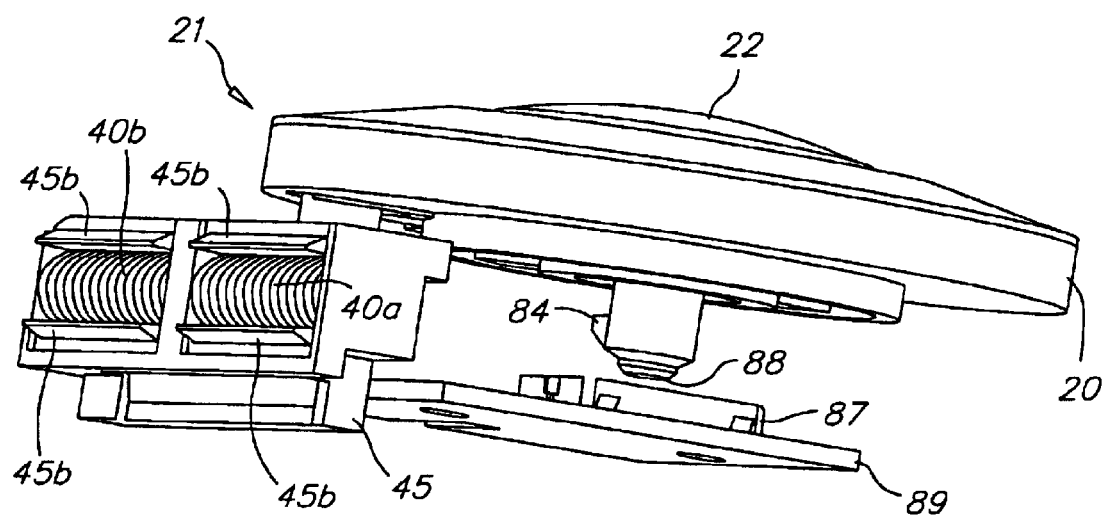
FIG. 13B is a rotated perspective view of the portion of a door opening mechanism shown in FIG. 13A.

Referring now to FIG. 9, sitting on top of the on/off detent spring 60 is a release button spring 70, which acts as additional capturing support for the release button 22 and on/off switch gear 20, as well as provides the vertical spring force to the release button 22. In one preferred embodiment, both flat springs 60 and 70 are being held down by screws 74, although other pins or heat stake elements would work as well. The screws or pins are secured to the three posts 12e formed on the top face 11 of the front housing 12.

The release button spring 70 includes three leaf spring legs 72a, 72b and 72c. The leaf spring legs 72a, 72b and 72c extend upward from the plane containing the detent spring, within the rotary on/off switch gear 20. The upper surfaces of the leaf spring legs 72a, 72b and 72c contact the release button 22, when installed and return the release button 22 to its normal position after the consumer has depressed the button 22, when capturing an image. As with the on/off detent spring 60, the release button spring 70 includes three screw openings 71 aligned with the openings 61 of the on/off detent spring 60 so that the screws 74 pass through and secure the release button spring 70 to the top surface 11 and so that the release button spring resists rotational forces when the rotary on/off switch gear 20 is turned.

Referring now to FIGS. 9–13B, the release button 22 includes a shaft 82 and a key 84. The shaft 82 and key 84 fit into the opening 12c in the post 12d, with the key 84 fitting through the rectangular key slot 12f. By turning the release button 22 clockwise, the release button is held downwards by interconnection of the upper key surface to the lower front shell hole surface. Turning the release button 22 further, one release spring leg 72b of the release button spring 70 will interlock with a track 86 on the lower surface of the release button 22. The release button 22 is now permanently captured in the vertical direction and is protected against movement in the rotational direction. The three leaf spring legs 72; 72b and 72c of the release button spring 70 will push the button upwards. The lowest surface 88 of the release button shaft 84 will push against and activate a tactile switch 87 on the PCB 89 or other switch device. As such, once the release button 22 shaft 84 is inserted through the bearing surface 12d and is rotated clockwise with the key 84 no longer aligned with the key slot 12f and the leaf spring 72b is trapped in the track 86, the release button 22 is locked into the housing without the need for a "c" ring and corresponding groove on the stem 84.

The Rotary to Linear Door Linkage Mechanism

One particular embodiment of the door opening mechanism will now be described in connection with FIGS. 13A–17. The door opening mechanism of the present embodiment translates the rotary motion of the rotary on/off switch gear 20 to the linear up/down motion of the lens door 16. As described above, the door controller 45 is engaged with the rotary on/off switch gear 20 via the door control pin 45a. To secure the open and closed end positions of the lens door 16, a spring biased lever is used.

A lever 50 is attached between the door controller 45 and the lens door 16 by means of a series of bends on the lever 50 and the door 16. More specifically, a finger 52 of lever 50 is connected to body portion 50a of the lever 50 at a bend portion. Similarly, the finger 55 is connected to an arm portion 50c of the lever 50 by a bend portion. The lens door loop 16b has a corresponding bend to facilitate mating with the finger 55. Two other bends 19 of the lens door slide portion 16c interact with the lens door mask (not shown) and build a guide rail mechanism for the up and down motion of the lens door 16.

The present door lever mechanism has an incorporated spring arm 54, which is part of the lens door lever 50. During lens door motion, a wedge portion 54a of the spring arm 54 moves over a roller 58 to reach two different end positions and provide an "over the center" approach to ensuring two discrete opened and closed positions of the lens door 16. Spring portion 54 is attached to lever body portion 50b.

Figure 20:
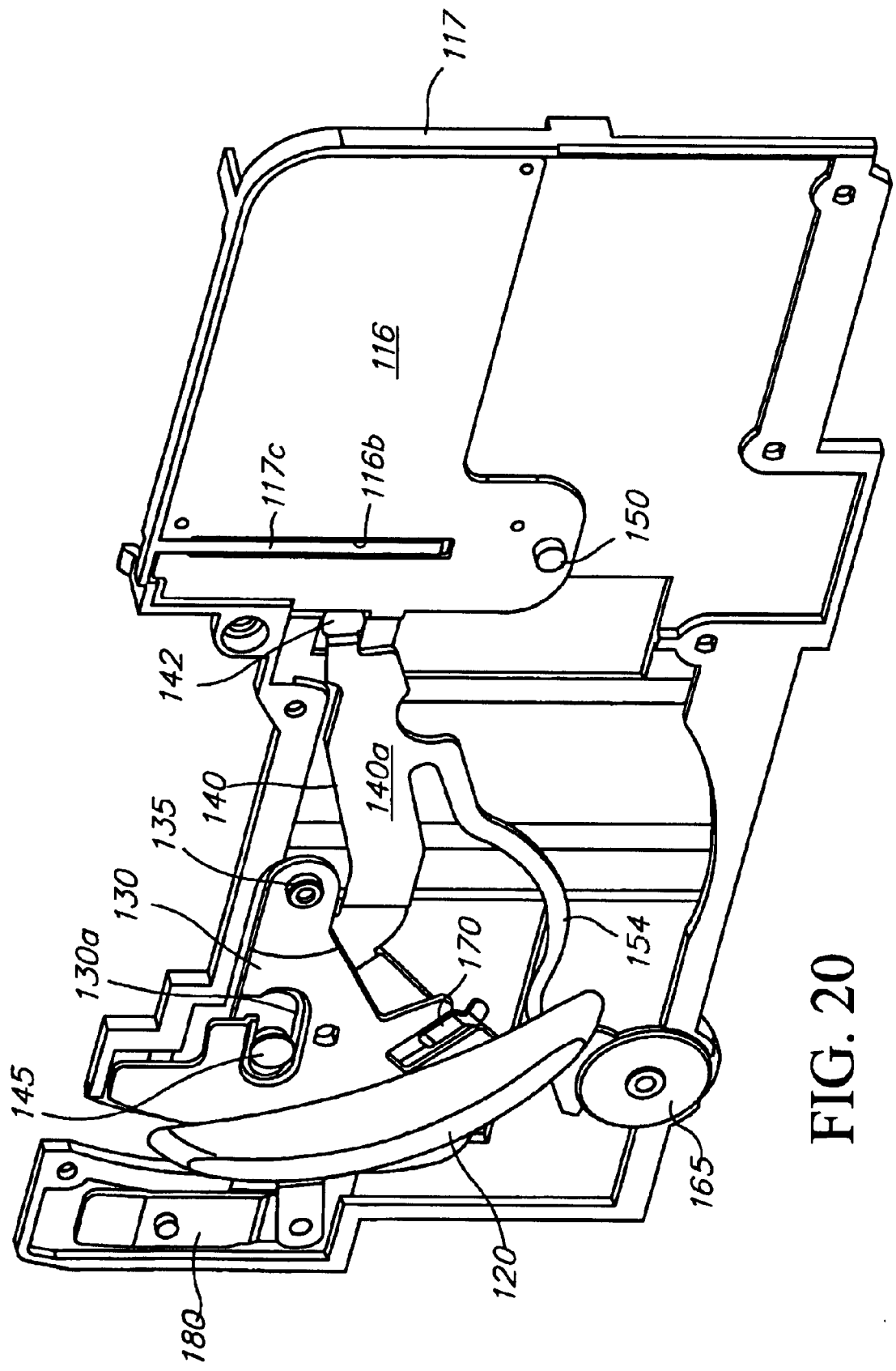
FIG. 20 is a perspective view of a portion of the door linkage mechanism of another embodiment of the present invention.

The pre-load of the spring portion 54 (linked through the bends on the lens door and the activation lever by the two end positions of the spring) secures the open and closed positions of the lens door 16. The lens door lever 50 has a bearing connection through a pin 56 of the lens door that is captured by a thin washer. As such, the door lever 50 pivots around the pin 56 in response to motion of the finger 52, connector 45 and rotary switch gear 20. The pivoting of the lever 50 serves to slide the ribs 19 in the guide track 12g and open or closed the lens door 16. Ribs 19 may be formed in or punched from the guide portion 16c, or may comprise another material affixed to the guide portion 16c. The spring wedge 54a passing over the roller 58 from one side to the takes over the opening or closing of the door after the initial turn of the rotary switch gear 20. The lens door 16 is fixed open or closed depending upon which side of the roller 58 the wedge 54a stops. The roller 58 may be fixed to the front cover 12 or to a part or mask adjacent the front cover 12 (as is shown in FIG. 20 in connection with another embodiment of the present invention).

The present particular embodiments shown in FIGS. 15–18 are additionally shown including a damage protection mechanism to prevent the lens door 16, the door lever 50, 90 or the switch connector 45, from being damaged if the lens door 16 is manually forced open by the user. Located within two opposite slots of the lens door connector 45 are two lens door guide pins 41a and 41b located coaxially within the springs 40a and 40b. The guide pins 41a and 41b and springs 40a and 40b are maintained in place in the slots of the connector 45 by two side walls 45b which are heat staked to the connector 45. The rounded lens door lever finger 52 engages the connector 45 between the two lens door guide pins 41a and 41b. Interacting with the bottom surface of the lens door connector 45 on the lens door lever 50 are two radial shaped fingers 53, which are locked into position by the bent surface adjacent the finger 52 formed on the lens door lever 50. The rounded surface portions of the fingers 53 help to guide the lens door connector 45 towards the front lens door surface 16a.

The door springs 40a and 40b and guide pins 41a and 41b in combination act as a lens door part damage prevention device. In event that the lens door is being forced open, the springs 40a and 40b would retract and allow the lens door lever 50 and lens door 16 to move freely. This damage prevention would also act similar if the lens door knob 20a were rotated (clockwise or counter clockwise) while the lens door was being opened or closed by force.

Figure 18:
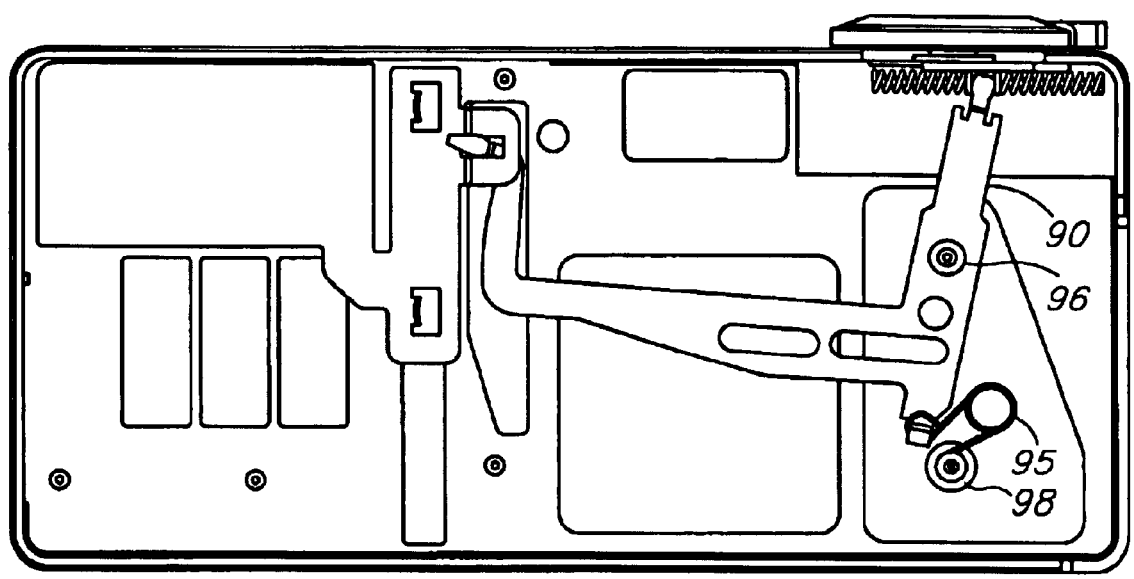
FIG. 18 is a side plan view of door opening mechanism in accordance with another particular embodiment of the present invention.
Figure 19:
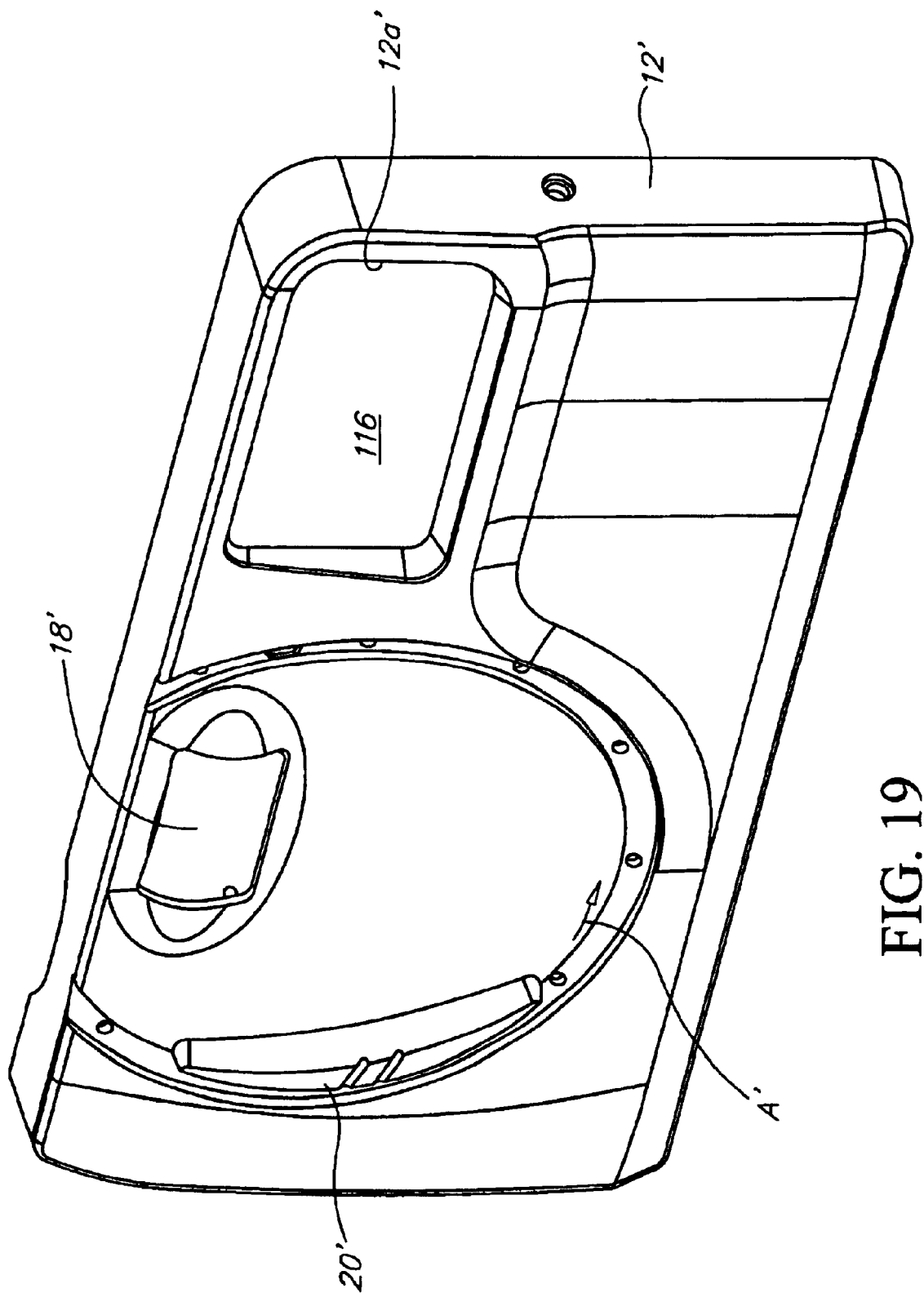
FIG. 19 is a perspective view of a portion of an image capture device, shown in accordance with another embodiment of the present invention.

Referring now to FIG. 18, there is shown an alternate embodiment of the rotary to linear door linkage mechanism using an omega type spring 95 to accomplish the two discrete positions of the door lens 16. Whereas the remainder of the parts are essentially the same as described in connection with FIG. 15, the lever 90 differs from the lever 50 such that the lever 90 does not include an integral spring portion. Rather a spring 95 with two end loops, similar to an omega spring function, interacts between a pin 98 connected to the front cover 12 (or a part adjacent the front cover 12) and a hook 97 on the lens door lever 90. When the gear 20 is rotated to the "on" position, the lever 90 and spring 95 are rotated, biasing the door 16 into the open position as described above in connection with the embodiment of FIG. 15. When the switch gear 20 is rotated back to the initial position, the lever 90 is rotated, rotating the spring and biasing the door into the closed position. The present embodiment could be adapted to use other types of springs, such as a hooked coil spring, a torsion spring, etc.

The Pendular to Linear Door Linkage Mechanism

A door opening mechanism will be described that translates the pendular motion of the grip 120 to the linear up and down motion of the lens door 116.

Figure 21:
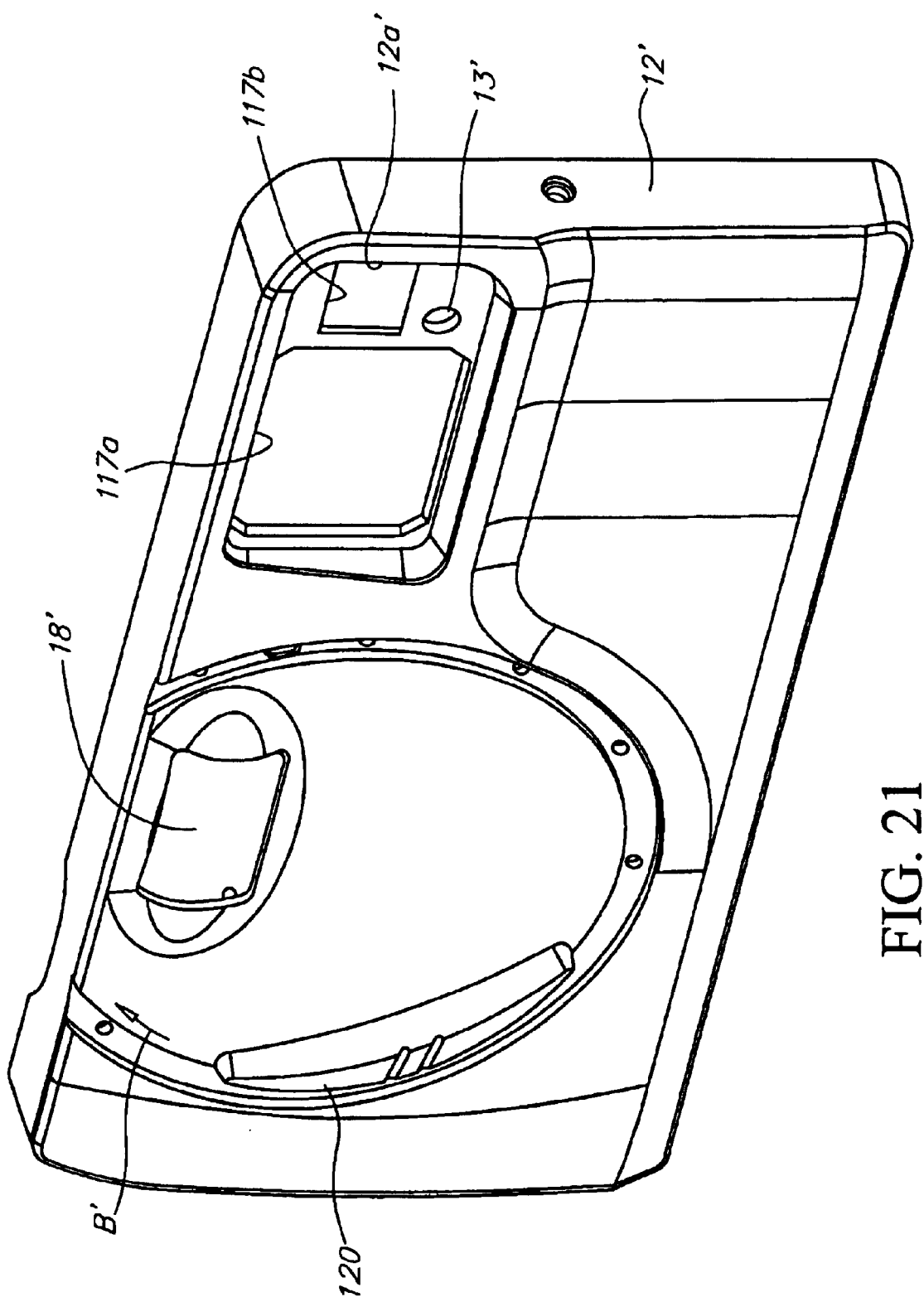
FIG. 21 is a perspective view of a portion of an image capture device, shown in accordance with the embodiment of FIG. 19.
Figure 22:
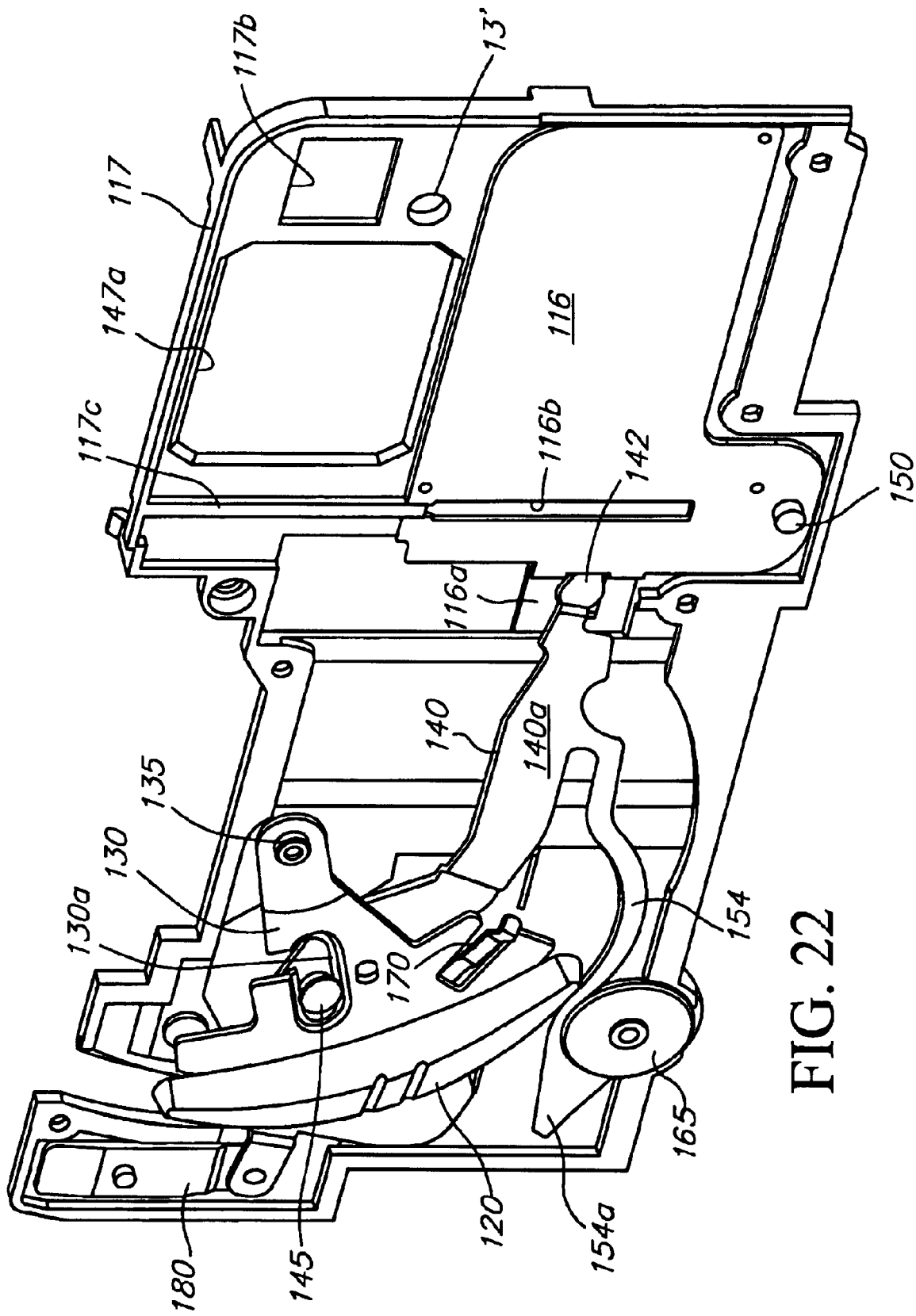
FIG. 22 is a perspective view of a portion of the door linkage mechanism of the embodiment of FIG. 20.
Figure 23:
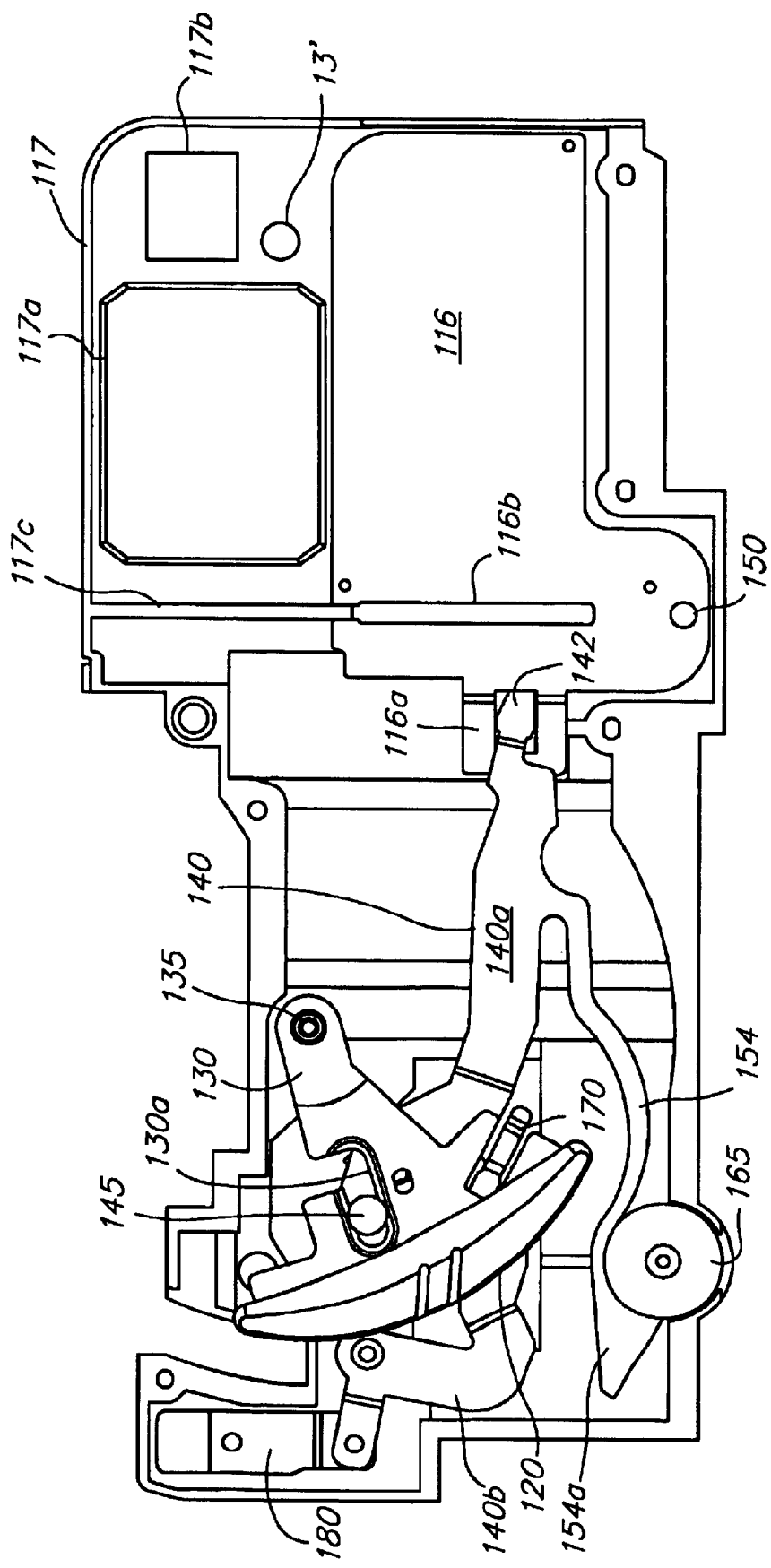
FIG. 23 is a front plan view of the door linkage mechanism of the embodiment of FIG. 20 with the door open.
Figure 24:
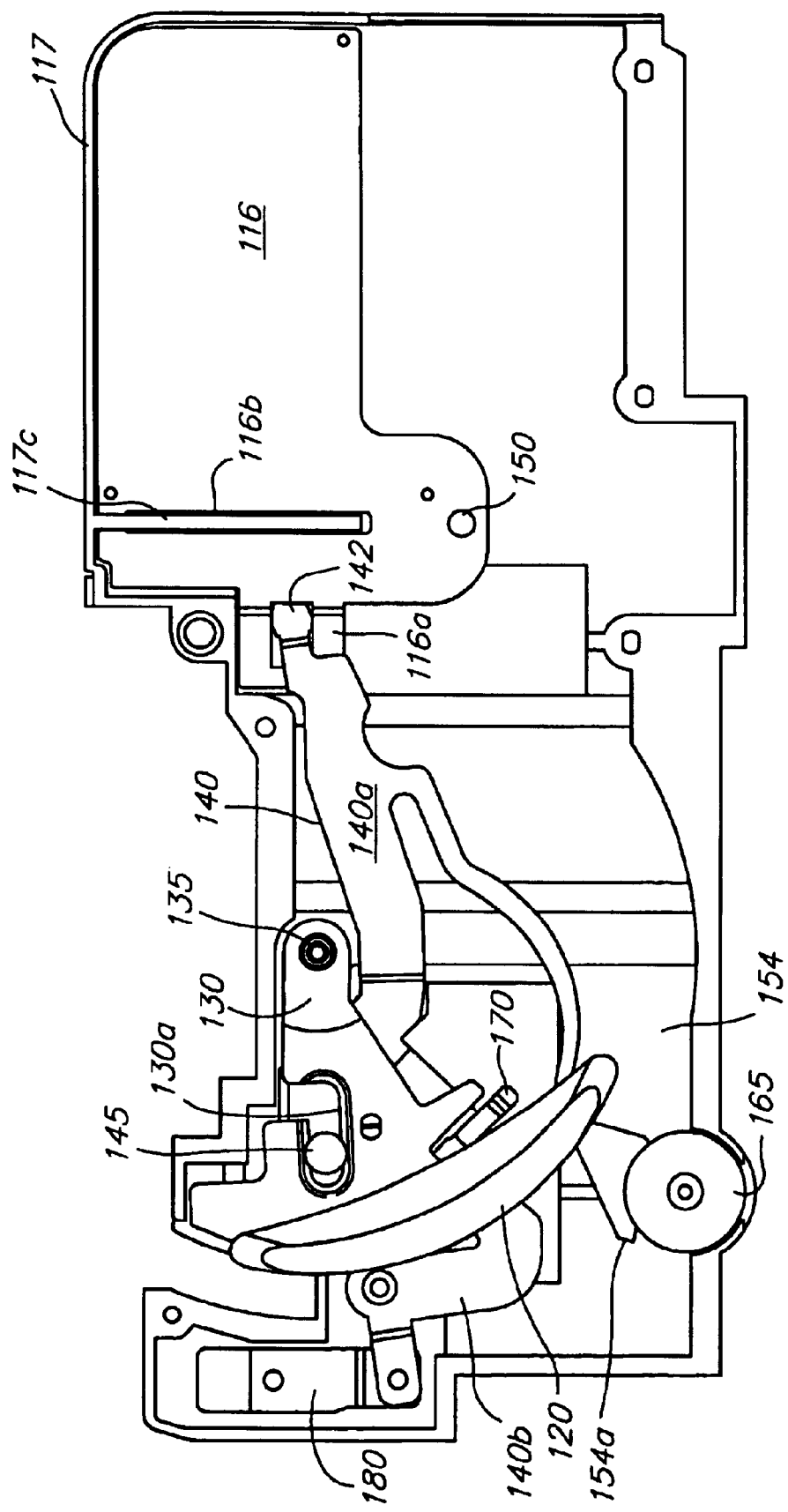
FIG. 24 is a front plan view of the door linkage mechanism of the embodiment of FIG. 20 with the door closed.
Figure 25:
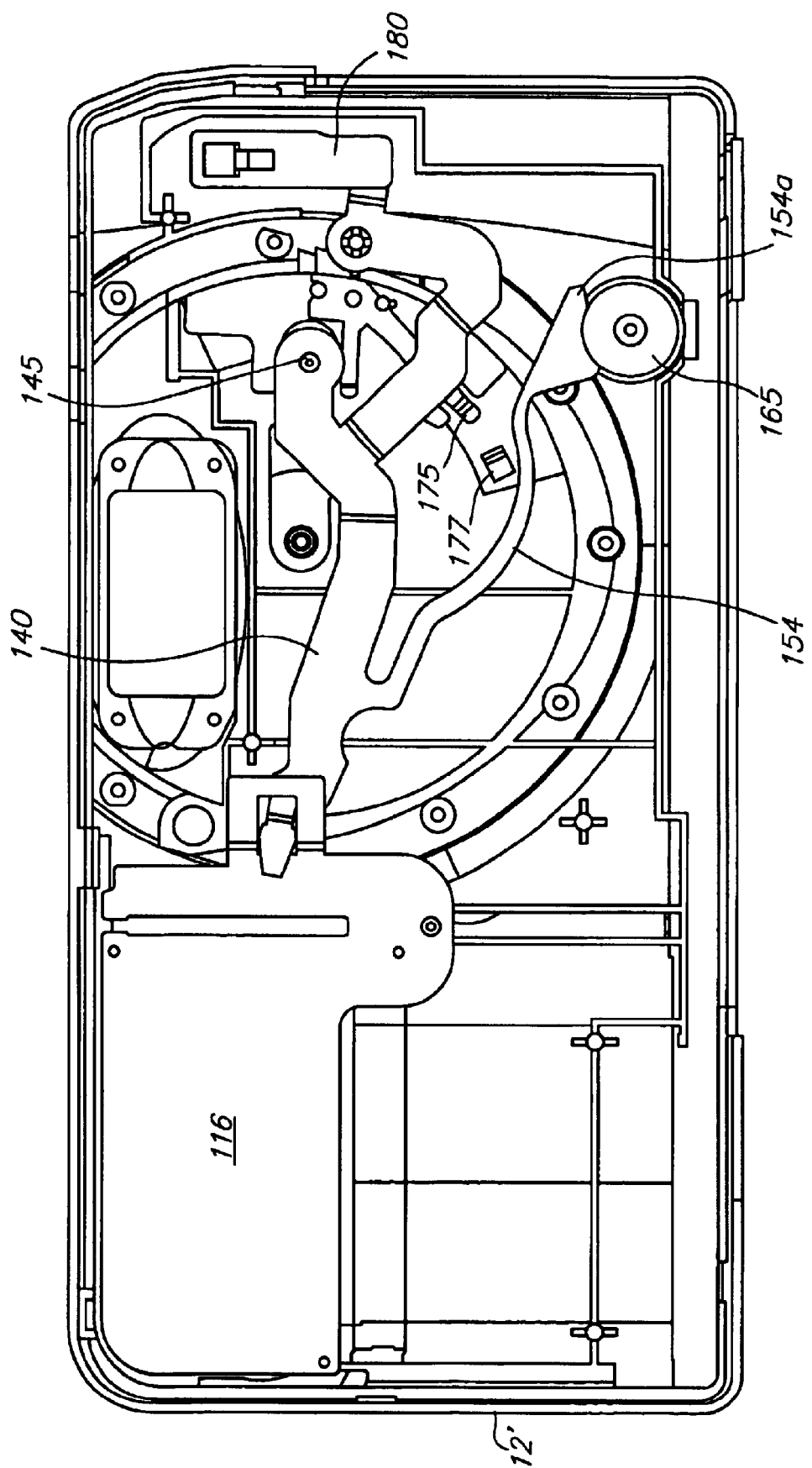
FIG. 25 is a rear plan view of the door linkage mechanism with the door closed in accordance with one embodiment of the present invention.
Figure 26:
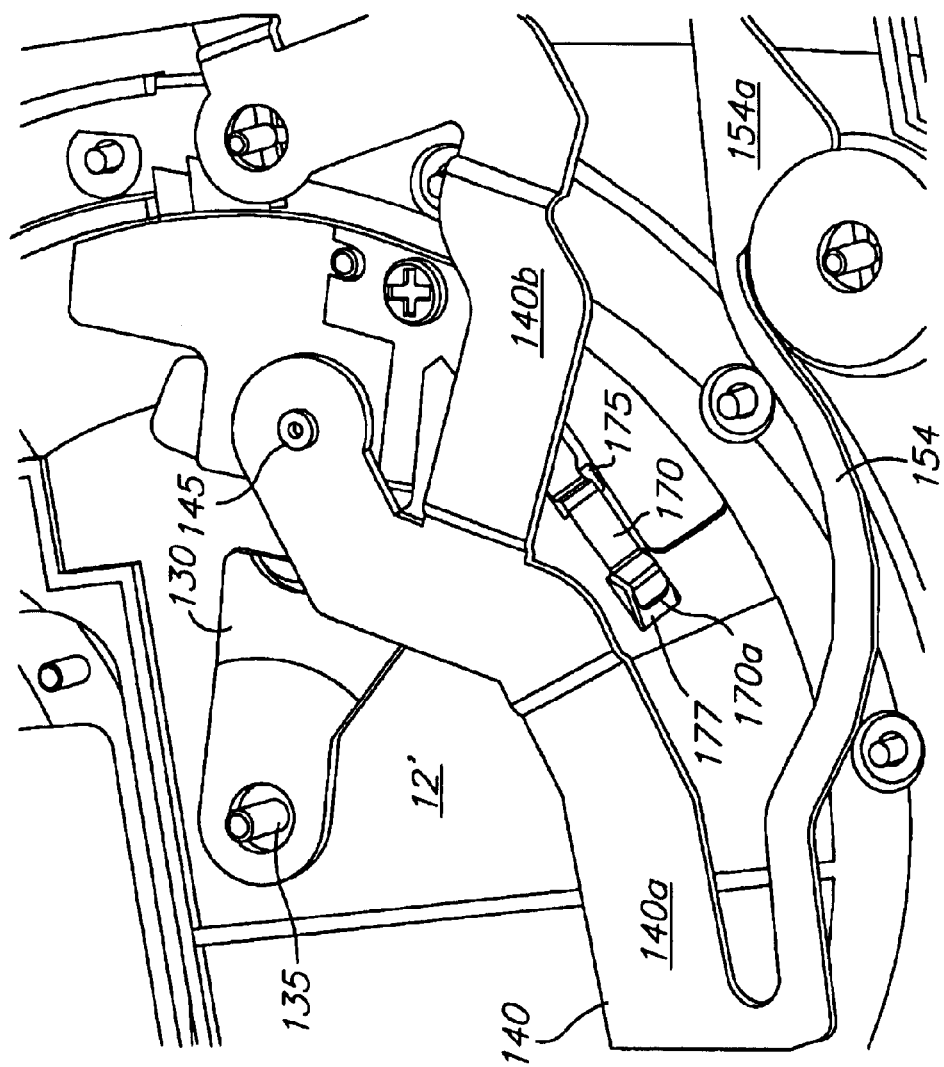
FIG. 26 is an enlarged perspective view of a portion of the door linkage mechanism of FIG. 25.

Referring now to FIGS. 19–26, there is shown the front shell 12' of an image capture device made in accordance with another particular embodiment of the present invention. Front shell 12' includes a plurality of apertures formed therethrough, such as a taking lens/viewfinder window 12a' and a flash window 18'. As shown in FIG. 21, when the lens door 116 is opened, the taking lens aperture 117a and viewfinder aperture 117b of the inner lens door mechanism support base 117 and an aperture 13' for a red eye reduction mechanism are exposed. Instead of having the rotary door-open/on/off switch (20 of FIG. 6) and nested release button described in connection with the above embodiments, the present particular embodiment uses a more direct method of opening and closing the lens door. Thus, the release button may be seated directly into the housing, instead of nested into a rotary switch.

Disposed on the surface of the front shell 12', in the present particular embodiment, is a crescent shaped grip 120. Located beneath the grip 20' and through the housing 12' is a track (not shown) that permits the grip 120 to be rotated from a first position in which the lens door 116 is closed to a second position, in which the lens door 116 is open. In the present particular embodiment, the grip 120 is rotated in the direction of arrow A' to open the lens door 116 and in the direction of arrow B' to close the lens door 116. Additionally, in the present particular embodiment, rotating the grip 120 in the direction A' additionally turns the camera on, while rotating the grip 120 in the direction of arrow B' turns the camera off.

Located between the front shell 12' and the inner lens door mechanism support base 117 is the mechanical door mechanism of one embodiment of the present invention. The grip 120 accessible from outside the front shell 12' is affixed to the free end of a pendular lever 130 sandwiched between the inner surface of the front shell 12' and the inner lens door mechanism support base 117. The other end of the pendular lever 130 is pinned to the inner lens door mechanism support base 117 by a rivet, pin, or head stake 135.

The pendular lever 130 is additionally attached to the lens door lever 140. A bearing pin 145 on the lens door lever 140 is engaged with an ovoid shaped slot 130a on the pendular lever 130. The walls of the slot 130a are angled conically towards the lens door lever to allow for a 3D conical motion of the pendular lever within the mechanism. Corresponding conical surfaces on the front shell 12' and the conically shaped parts (pendular lever slot 130 and crescent grip 20') and the pin 145 to slot 130a bearing arrangement enables three dimensional motion of the pendular lever 130/crescent grip 120 to the lens door lever 140.

The lens door lever 140 is attached to the lens door 116 by means of a series of bends on the lever 140 and the lens door 116. In response to rotary motion of the pendular lever 130, the lens door lever 140 seesaws around the pivot point formed by the pin 145. A finger 142 of lever 140 is connected to body portion 140a of the lever 140 at a bend portion. The lens door 116 includes a loop 116a, which has a corresponding bend to facilitate mating with the finger 142. Additionally, a slot 116b on the lens door interacts with a guide rib 117c on the inner lens door mechanism support base 117 to ensure the straight up and down motion of the lens door 116 when the lens door lever 140 is rotated in response to rotation of the grip 120 and pendular door lever 130. Further, a lens door guide pin 150 is fixed to the lens door 116. The guide pin 150 slides within a slot formed of guide rails (not shown) in the front shell 12' to additionally ensure that the lens door 116 maintains a straight up and down motion.

Additionally, the lens door lever 140 of the present embodiment has an incorporated spring arm 154, which is part of the lens door lever 140. During lens door motion, a wedge portion 154a of the spring arm 154 moves over a roller 165 to reach two different end positions and provide an "over the center" approach to ensuring two discrete opened and closed positions of the lens door 116. Spring portion 154 is attached to lever body portion 140a.

The pre-load of the spring portion 154 (linked through the bends on the lens door and the activation lever by the two end positions of the spring) secures the open and closed positions of the lens door 116. Due to the bearing connection between the lens door lever 140 and the pendular lever 130, and the fixed portion of the pendular lever at the pin 135, rotary motion of the grip 120 in the direction of arrow A' or arrow B', pivots the lens door lever 140 around the pin 145 and, in response to the force and motion of the finger 142 pulling the lens door loop 116a, serves to slide the lens door 116 into the open or closed position. Simultaneously, by action of the spring arm 154, the spring wedge 154a is passed over the roller 165 from one side to the other and the resulting forces fully open or close the lens door after the initial turn of the crescent grip 120. The lens door 116 is fixed open or closed depending upon which side of the roller 165 the wedge 154a stops.

To further retain the lens door 116 in the up or down position, a detent mechanism 170 is additionally affixed to the pendular lever 130. The detent mechanism 170 is spring biased to lock the end portion 170a into one of the indentations 175 and 177 in the inner surface of the front shell 12' when the pendular lever 130 is rotated by the grip 120. This interaction locks the lens door pendular lever 130 into one of two discrete positions for opening or closing the lens door 116 and prevents the pendular lever from drifting during use. As it takes a force to move the detent mechanism 170 out of the indentations 175 and 177, only an affirmative force on the grip 120 will open or close the lens door 116.

Figure 28:
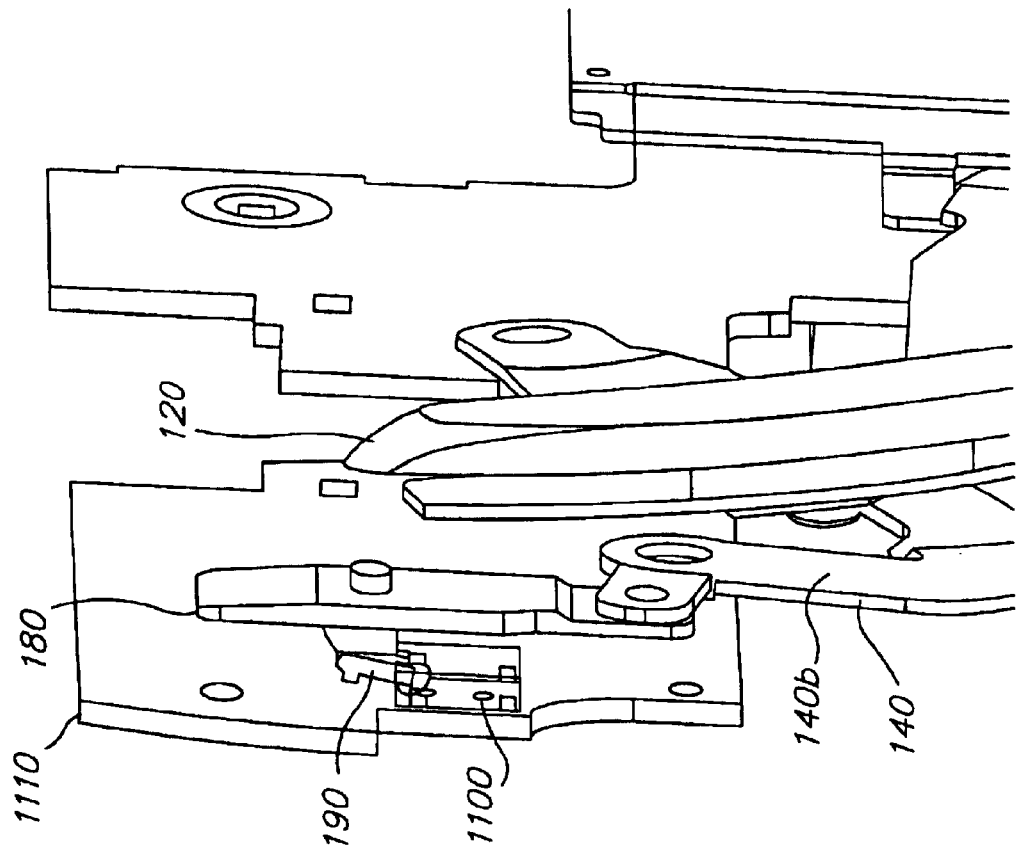
FIGS. 27–28 show a partial perspective view of a door mechanism including a switch used to turn the camera on and off, in accordance with one particular embodiment of the present invention.
Figure 27:
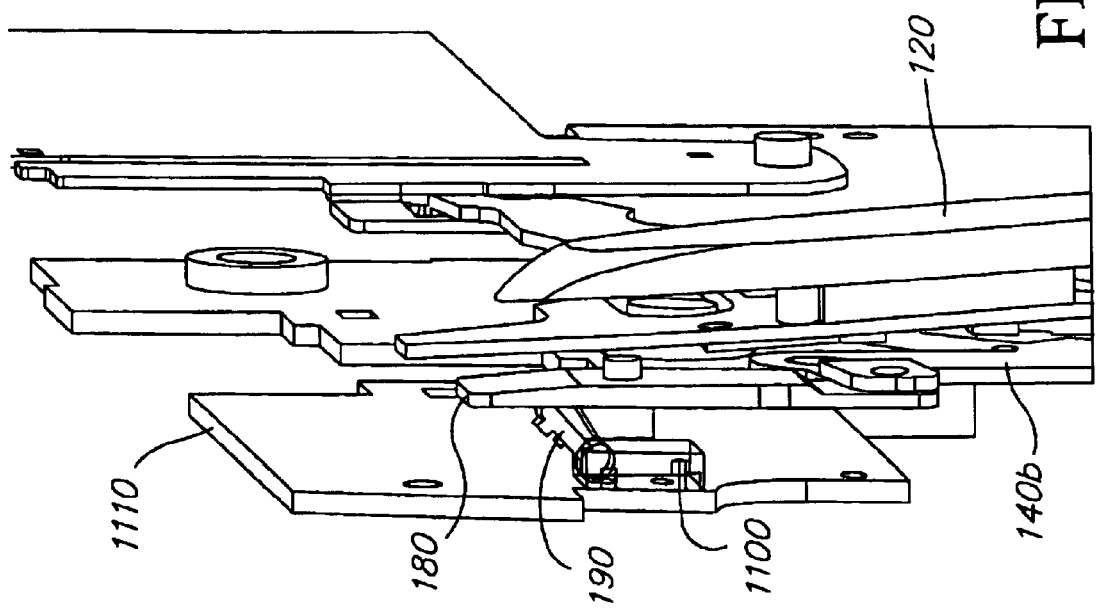

Additionally, as noted above, the pendular door mechanism of one particular embodiment of the present invention is additionally used to turn the camera on and off. The lens door lever 140 additionally includes and arm portion 140b that is pivotally connected to a slide switch 180. Referring more particularly to FIGS. 27 and 28, slide switch 180 operates a toggle lever 190 of an electrical switch 1100 on a PCB 1110 disposed behind the lens door lever 140 into one of two possible positions corresponding to the on and off positions of the camera. Alternatively, metallic fingers may be attached to the slide switch 180 so that motion of the lever 140 from one position to another causes the slide switch 180 to contact traces on a PCB located behind the slide switch and open or close a circuit to turn the camera on or off. It can be seen that interaction between the detent mechanism and the indentations 175 and 177 additionally defines the camera on and off positions.

While the invention has been described with reference to certain embodiments, it will be understood by those skilled in the art that various changes may be made and equivalents may be substituted for elements thereof without departing from the scope of the invention. For example, the lens door lever can be modified to omit the spring arm and roller and could be adapted to use other types of springs, such as a hooked coil spring, a torsion spring, etc. to achieve the same type of locking force. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lens door mechanism for an image capture device, comprising:
   an image capture device housing including a lens opening therethrough;
   a lens door actuator including a handle portion accessible through said housing;
   a lens door located within said housing, said lens door including a lens door loop;
   a lever in communication with said lens door actuator at a first end, a second end of said lever including a lever finger, said lever finger being engaged with said loop;
   a pivot pin located within said housing, said pivot pin permitting said lever to pivot around a pivot point during actuation of said lens door actuator; and
   wherein rotational motion of said handle portion pivots said lever about said pivot point to move said lens door linearly.

2. The lens door mechanism of claim 1, additionally including a guide track within said housing, said lens door additionally including an alignment pin engaged with said guide track, wherein rotational movement of said lens door actuator results in moving said lens door up and down along said guide track by said alignment pin.

3. The lens door mechanism of claim 1, additionally including a spring in communication with said lever to spring-bias said lever.

4. The lens door mechanism of claim 3, wherein said spring is connected between said lever and a pin fixed inside said housing.

5. The lens door mechanism of claim 3, wherein said spring is a spring arm fixed at a first end to said lever and having a second free end, the lens door mechanism additionally including a roller fixed inside said housing, wherein said second free end is in contact with said roller.

6. The lens door mechanism of claim 5, wherein said second free end includes a wedge portion that moves over said roller to provide momentum sufficient to aid said lever in fully opening and closing said lens door.

7. The lens door mechanism of claim 6, wherein at least one of said lever finger and said loop includes a bend in the material which enables said lever finger to engage said loop.

8. The lens door mechanism of claim 7, wherein said lever finger additionally includes a bend in the lever material to enable said lever finger to engage said loop.

9. The lens door mechanism of claim 8, wherein said loop additionally includes a bend in the lens door material to enable said lever finger to engage said loop.

10. The lens door mechanism of claim 3, wherein said lens door actuator includes a grip accessible through said housing and a pendular lever attached to said grip at a first end and pivotally fixed to the image capture device at a second end, and wherein said pivot pin attaches said lever to said pendular lever at the pivot point.

11. The lens door mechanism of claim 10, wherein said pendular lever further includes a slot in which said pivot pin slides when said lens door actuator is actuated using said grip.

12. The lens door mechanism of claim 11, wherein said slot includes conically sloped sides and said pivot pin includes a conically shaped surface that interacts with said slot in a complementary fashion.

13. The lens door mechanism of claim 10, wherein said pendular lever further includes a detent mechanism, the free end of which is spring biased against said housing, said housing further including a plurality of indentations, wherein rotation of said pendular lever slides said free end between one of said plurality of indentations to bias said pendular lever into one of a lens door open position and a lens door closed position.

14. The lens door mechanism of claim 13, further including an electrical switch for switching the image capture device, using said lens door actuator, between an on mode when said pendular lever is in said lens door open position and an off mode when said pendular lever is in said lens door closed position.

15. The lens door mechanism of claim 3, wherein said lens door actuator further includes, a rotary gear located outside said housing, and a connector including a control pin that is engaged through said housing with said rotary gear, said lever additionally including a second finger located distal from said lever finger, wherein said second finger is engaged with said connector such that rotational motion of said rotary gear moves said control pin and said second finger linearly, and pivots said lever on the pivot point to move said lens door linearly.

16. The lens door mechanism of claim 15, wherein said connector additionally includes two slots, each slot containing therein a guide pin and a spring, wherein each guide pin is located coaxially within each spring, each guide pin additionally including a bearing surface in contact with said second finger when said second finger is engaged with said connector, between said two slots.

17. The lens door mechanism of claim 15, further including an electrical switch for switching the image capture device, using said lens door actuator, between an on mode when said lever is in a lens door open position and an off mode when said lever is in a lens door closed position.

18. A lens door mechanism for an image capture device, comprising:

a grip accessible to the user;

a pendular lever attached to said grip at a first end and pivotally fixed to the image capture device at a second end;

a lens door lever attached to said pendular lever at a pivot point, said lens door lever including a lever finger;

a lens door including a loop, said lever finger being engaged with said loop via a bend in one of said lever finger and said lens door;

wherein rotational motion of said grip pivots said lens door lever around said pivot point to move said lens door linearly.

19. The lens door mechanism of claim 18, wherein said lever further includes a spring arm having a first end fixed to said lever and having a second free end, the lens door mechanism additionally including a roller fixed inside said housing, wherein said second free end is in contact with said roller.

20. The lens door mechanism of claim 19, wherein said second free end includes a wedge portion that moves over said roller to provide momentum sufficient to achieve and maintain a discrete lens door open position and a discrete lens door closed position.

21. The lens door mechanism of claim 20, further including an electrical switch for switching the image capture device, using said lens door actuator, between an on mode when said pendular lever is in said lens door open position and an off mode when said pendular lever is in said lens door closed position.

22. A method of capturing a nested release switch in an image capture device housing, comprising:

(a) providing an image capture device housing including a cylindrical bearing shaft post extending from the upper surface thereof, said cylindrical bearing shaft including a release shaft opening and a key opening, therethrough;

(b) mounting a release button spring to said image capture device housing around said cylindrical bearing shaft post, said spring including a spring body and a plurality of leaf spring legs extending upward from said spring body;

(c) providing a release button including a shaft and a key portion extending from said shaft and a track located on the lower surface of the release button;

(d) inserting said shaft of said release button into said release shaft opening while aligning said key portion with said key opening, after step (b); and (e) turning said release button after step (d) to connect the upper surface of said key portion with the inside surface of said housing and simultaneously trap the upper surface of one of said plurality of spring legs in said track to prevent further movement of said release button in the rotational direction, and wherein the upper surfaces of said plurality of spring legs contact the lower surface of said release button to normally bias said release button away from said housing.

23. The method of claim 22, wherein said providing step additionally includes providing a switch device inside said housing in alignment with said release shaft opening such and said inserting step includes the step of aligning the end of said shaft with said switch device, such that depression of said release button by a user causes the end of said shaft to close said switch, and upon the release of said release button, said plurality of spring legs return said release button to its normal position.

24. The method of claim 23, further including the step of:
(f) providing a rotary switch gear rotatably engaged with said cylindrical bearing shaft post prior to step (b).

25. The method of claim 24, wherein said image capture device further includes an electrical switch for switching the image capture device between an on mode and an off mode by rotating said rotary switch gear between a first position and a second position.

26. The method of claim 25, further including the step of
(g) providing prior to step (d) a detent spring including a detent spring finger, said detent spring being mounted circumferentially around said cylindrical bearing shaft post proximate to an upper surface of said rotary switch gear, wherein said upper surface of said rotary switch gear includes a plurality of detent notches, said detent spring finger sized to be received in each of said plurality of detent notches, wherein rotation of said rotary switch gear permits said detent spring finger to capture said rotary switch gear in a plurality of discrete positions by engaging each of said plurality of detent notches.

27. The method of claim 26, wherein step (f) additionally includes linking said rotary switch gear to a lens door mechanism such that rotation of said rotary switch gear additionally moves a lens door of said image capture device between a lens door open position and a lens door closed position.

* * * * *